(12) United States Patent
Warren et al.

(10) Patent No.: US 8,924,944 B2
(45) Date of Patent: Dec. 30, 2014

(54) IMPLEMENTATION OF DISTRIBUTED METHODS THAT SUPPORT GENERIC FUNCTIONS

(75) Inventors: Richard A. Warren, Acton, MA (US); Sudarshan Raghunathan, Cambridge, MA (US); Adam P. Jenkins, Marlborough, MA (US)

(73) Assignee: Microsoft Corporation, Redmond, WA (US)

( * ) Notice: Subject to any disclaimer, the term of this patent is extended or adjusted under 35 U.S.C. 154(b) by 218 days.

(21) Appl. No.: 13/539,244

(22) Filed: Jun. 29, 2012

(65) Prior Publication Data
US 2014/0007060 A1 Jan. 2, 2014

(51) Int. Cl.
*G06F 9/44* (2006.01)
*G06F 9/45* (2006.01)

(52) U.S. Cl.
USPC .............................. 717/140; 717/116; 717/148

(58) Field of Classification Search
CPC ......... G06F 9/4433; G06F 8/41; G06F 8/447; G06F 9/45516; G06F 9/45504
See application file for complete search history.

(56) References Cited

U.S. PATENT DOCUMENTS

| | | | |
|---|---|---|---|
| 5,095,522 A | 3/1992 | Fujita et al. | |
| 5,999,987 A | 12/1999 | O'Farrell et al. | |
| 7,159,211 B2 | 1/2007 | Jalan et al. | |
| 7,346,901 B2 * | 3/2008 | Syme et al. | 717/116 |
| 7,676,791 B2 | 3/2010 | Hamby et al. | |
| 7,725,679 B1 | 5/2010 | Anderson et al. | |
| 7,743,087 B1 | 6/2010 | Anderson et al. | |
| 7,783,686 B2 | 8/2010 | Gates et al. | |
| 7,853,937 B2 | 12/2010 | Janczewski | |
| 8,046,746 B2 | 10/2011 | Tillmann et al. | |
| 8,156,153 B2 | 4/2012 | Wang et al. | |
| 8,296,743 B2 * | 10/2012 | Linderman et al. | 717/140 |
| 8,458,680 B2 * | 6/2013 | Crutchfield et al. | 717/140 |
| 8,739,137 B2 * | 5/2014 | Siskind et al. | 717/140 |
| 8,745,603 B2 * | 6/2014 | McGuire et al. | 717/140 |
| 2003/0061602 A1 * | 3/2003 | Graham et al. | 717/148 |
| 2003/0115573 A1 * | 6/2003 | Syme et al. | 717/116 |
| 2003/0159130 A1 * | 8/2003 | Broussard et al. | 717/120 |
| 2005/0102353 A1 | 5/2005 | Murphy et al. | |

(Continued)

OTHER PUBLICATIONS

Dragos et al., "Compiling Generics Through User-Directed Type Specialization", 2009 ACM, ICOOOLPS'09, Jul. 6-10, 2009, Genova, Italy, pp. 1-6; <http://dl.acm.org/results.cfm?h=1&cfid=407740627&cftoken=29320742>.*

(Continued)

*Primary Examiner* — Thuy Dao
*Assistant Examiner* — Ben C Wang
(74) *Attorney, Agent, or Firm* — Nicholas Chen; Brian Haslam; Micky Minhas (57) ABSTRACT

Embodiments are directed to providing a generic software function for a plurality of data types in a distributed environment and to implementing type checking at compile time and at runtime. In one scenario, a computer system receives a portion of software code for a distributed software application, where the software code is written as a generic function in a computer programming language that supports reflection. The computer system presents a function signature at runtime to a just-in-time (JIT) compiler. The function signature describes which of multiple different input and output data types the generic function is configured to work with. The computer system also implements reflection at runtime to resolve each generic function to a function pointer after compilation by the JIT.

20 Claims, 4 Drawing Sheets

(56) References Cited

U.S. PATENT DOCUMENTS

| | | | |
|---|---|---|---|
| 2005/0149903 A1 | 7/2005 | Archambault et al. | |
| 2005/0240621 A1 | 10/2005 | Robertson et al. | |
| 2007/0028210 A1* | 2/2007 | Meijer et al. | 717/140 |
| 2008/0195646 A1 | 8/2008 | Meijer et al. | |
| 2008/0228853 A1 | 9/2008 | Brinck et al. | |
| 2008/0320453 A1* | 12/2008 | Meijer et al. | 717/140 |
| 2009/0113216 A1 | 4/2009 | Chen et al. | |
| 2010/0162211 A1* | 6/2010 | Ostrovsky et al. | 717/114 |
| 2010/0211753 A1 | 8/2010 | Yionen | |
| 2010/0235412 A1 | 9/2010 | Kawachiya et al. | |
| 2010/0299660 A1* | 11/2010 | Torgersen et al. | 717/148 |
| 2011/0010715 A1* | 1/2011 | Papakipos et al. | 717/140 |
| 2011/0022794 A1 | 1/2011 | Jibbe et al. | |
| 2011/0179402 A1* | 7/2011 | Buckley et al. | 717/140 |
| 2011/0265067 A1* | 10/2011 | Schulte et al. | 717/148 |
| 2011/0321010 A1 | 12/2011 | Wang | |
| 2012/0030672 A1 | 2/2012 | Zygmuntowicz et al. | |
| 2012/0185824 A1* | 7/2012 | Sadler et al. | 717/120 |
| 2014/0006473 A1 | 1/2014 | Raghunathan et al. | |
| 2014/0137087 A1* | 5/2014 | Cimadamore et al. | 717/140 |
| 2014/0189662 A1* | 7/2014 | Mameri et al. | 717/140 |

OTHER PUBLICATIONS

Allen et al., "Type Checking Modular Multiple Dispatch with Parametric Polymorphism and Multiple Inheritance", 2011 ACM, OOPSLA'11, Oct. 22-27, 2011, Portland, Oregon, USA, pp. 1-20; <http://dl.acm.org/results.cfm?h=1&cfid=407740627&cftoken=29320742>.*

Vanags et al., "Strongly Typed Metadata Access in Object Oriented Programming Languages with Reflection Support", Baltic J. Modern Computing, vol. 1 (2013), Jul. 30, 2013, No. 1, 77-100, pp. 77-100; <http://www.bjmc.lu.lv/fileadmin/user_upload/lu_portal/projekti/bjmc/Contents/1_1-2_6_Vanags.pdf>.*

Milewicz et al., "SimpleConcepts: Support for Constraints on Generic Types in C++", Sep. 8-11, 2013 IEEE, pp. 1535-1540; <http://ieeexplore.ieee.org/stamp/stamp.jsp?tp=&arnumber=6644220>.*

Arabe, et al., "Dome: Parallel Programming in a Distributed Computing Environment", In Proceedings of the 10th International Parallel Processing Symposium, Apr. 15, 1996, pp. 218-224.

Hoogerwerf, Ronnie, "The "Cloud Numerics" Programming and Runtime Execution Model", Published on: Jan. 11, 2012, Available at: http://blogs.msdn.com/b/cloudnumerics/archive/2012/01/11/the-cloud-numerics-programming-and-runtime-execution-model.aspx.

Chang, et al., "Evaluating the Performance Limitations of MPMD Communication", In Proceedings of the ACM/IEEE conference on Supercomputing (CDROM), Nov. 15, 1997, pp. 1-10.

U.S. Appl. No. 13/828,981, filed Mar. 14, 2013, Warren et al.

Kovari, et al., "WebSphere and .NET Coexistence", In Redbooks of IBM, Mar. 2004, 612 pages.

"Cutting Edge: Collections and Data Binding", Published May 2005, Available at <<http:msdn.microsoft.com/en-us/magazine/cc163798.aspx>>.

Strahl, Rick, "Visual FoxPro Web Services Revisited", Published Oct. 2007, Available at <<http://www.code-magazine.com/articleprint.aspx?quickid=0703062&pringmode=true>>.

Serviceware Downloads, Retrieved on: Feb. 21, 2013, Available at: http://www.idesign.net/Downloads.

Meier, et al., "Improving .NET Application Performance and Scalability", Published on: May 2004, Available at: http://msdn.microsoft.com/en-in/library/ff647768.aspx.

Hassen, et al., "HAWK: A Runtime System for Partitioned Objects", In Proceedings of Parallel Algorithms and Applications, vol. 12, Issue 1-3, Aug. 1997, pp. 205-230.

Sinha, et al., "Adaptive Runtime Partitioning of AMR Applications on Heterogeneous Clusters", in Proceedings of the 3rd IEEE International Conference on Cluster Computing, Mar. 2001, pp. 435-442.

Hassen, Saniya Ben, "Prefetching Strategies for Partitioned Shared Objects", In Proceedings of the 29th Annual Hawaii International Conference on System Sciences, Jan. 3, 1996, pp. 261-270.

Cardelli, Luca, "Obliq A Language with Distributed Scope", Published on: Jun. 3, 1994, Available at: http:www.hpl.hp.com/techreports/Compaq-DEC/SRC-RR-122.pdf.

U.S. Appl. No. 13/828,981, Mar. 26, 2014, Office Action.

Notice of Allowance dated Aug. 1, 2014 cited in U.S. Appl. No. 13/828,981.

* cited by examiner

IMPLEMENTATION OF DISTRIBUTED METHODS THAT SUPPORT GENERIC FUNCTIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed using integrated development environments (IDEs). These IDEs allow developers to write and debug software code. Developers typically write software applications using multiple different functions or methods. Typically, each of these methods or functions is developed for a specific data type. Examples of data types include integer, float, string, character and others. Accordingly, if a developer wants to use a certain function or method with multiple different data types, the developer has to write separate functions or methods for each data type.

BRIEF SUMMARY

Embodiments described herein are directed to providing a generic software function for a plurality of data types in a distributed environment and to implementing features such as type checking and overload resolution for generic methods both at compile time and at runtime. In one embodiment, a computer system receives a portion of software code for a distributed software application, where the software code is written as a generic function in a computer programming language that supports reflection. The computer system presents a function signature at runtime to a just-in-time (JIT) compiler. The function signature describes which of multiple different input and output data types the generic function is configured to work with. The computer system also implements reflection at runtime to resolve each generic function to a function pointer after compilation by the JIT.

In another embodiment, a computer system implements type checking at compile time and at runtime. The computer system receives a portion of software code for a distributed software application, where the software code being written as a generic function in a computer programming language that supports reflection. The computer system presents a function signature at runtime to a just-in-time (JIT) compiler. The function signature describes which of multiple different input and output data types the generic function is configured to work with. The computer system performs type checking on the generic function at compile time and at runtime to determine whether type-based errors exist in the software code and implements reflection at runtime to resolve each generic function to a function pointer after compilation by the JIT.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Embodiments described herein are directed to providing a generic software function for a plurality of data types in a distributed environment and to implementing features such as type checking and overload resolution for generic methods both at compile time and at runtime. In one embodiment, a computer system receives a portion of software code for a distributed software application, where the software code is written as a generic function in a computer programming language that supports reflection. The computer system presents a function signature at runtime to a just-in-time (JIT) compiler. The function signature describes which of multiple different input and output data types the generic function is configured to work with. The computer system also implements reflection at runtime to resolve each generic function to a function pointer after compilation by the JIT.

In another embodiment, a computer system implements type checking at compile time and at runtime. The computer system receives a portion of software code for a distributed software application, where the software code is written as a generic function in a computer programming language that supports reflection. The computer system presents a function signature at runtime to a just-in-time (JIT) compiler. The function signature describes which of multiple different input and output data types the generic function is configured to work with. The computer system performs type checking on the generic function at compile time and at runtime to determine whether type-based errors exist in the software code and implements reflection at runtime to resolve each generic function to a function pointer after compilation by the JIT.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
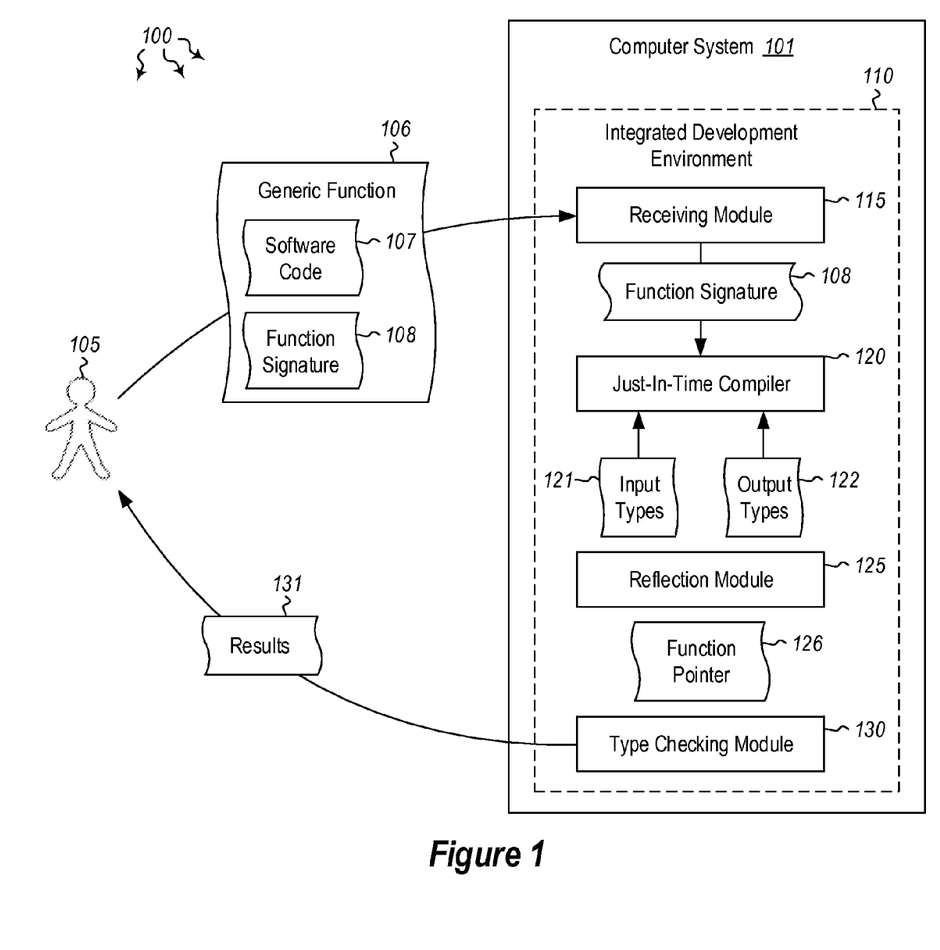
FIG. 1 illustrates a computer architecture in which embodiments of the present invention may operate including providing a generic software function for a plurality of data types in a distributed environment.

FIG. 1 illustrates a computer architecture 100 in which the principles of the present invention may be employed. Computer architecture 100 includes computer system 101. Computer system 101 may be any type of local or distributed computer system, including a cloud computing system. The computer system includes various modules for performing a variety of different functions. For instance, receiving module 115 may receive inputs from user 105. The receiving module 115 may be part of an integrated development environment (IDE) 110. The receiving module 115 receives functions as inputs from user 105.

For instance, the user 105 may input a generic function 106 into the IDE 110 which is received at module 115. The generic function 106 may include software code 107 and/or a function signature 108. The function signature 108 may describe which of a variety of different input and output data types the generic function 106 is configured to work with. Each of these input and output data types may be used with the generic function 106. Indeed, the generic function 106 is designed to work with many different types, so that a developer can write a single function (a generic function) and have that function work with multiple different data types.

In some cases, invocation of methods in a distributed runtime environment (sometimes referred to as Remote Procedure Calls or RPCs), may be a complex process which involves the registration of specific functions as part of a "service" deployment. This may require system administrative privileges on the part of the person whose job it is to deploy the software. Moreover, the process may not allow the user 105 to add, delete, or modify functionality. The generic functions described herein allow distributed applications to be created and subsequently modified to add, delete or modify functionality. A distributed runtime may be provided which leverages programming language "reflection" to provide this functionality to parallel programmers (e.g. user 105). From the user/programmer's point of view, distributed applications can be coded and run with virtually no features that are explicitly parallel.

In some embodiments, the developer 105 may not be made aware of any remote procedure call requirements. Still further, the developer 105 may not necessarily be aware that the only portions of their application which run "in parallel" are those functions supplied by the provided parallel libraries. The runtime may offer a "collective" API which executes a specified method (e.g. a C# method) on all parallel ranks. The "collective" implementation may be extended to include support of generic functions and function overloading, as well as allowing multiple input arguments and combinations of data types.

Some embodiments may implement a just-in-time (JIT) compiler along with programming language reflection (e.g. C# reflection). This provides additional functionality and allows even greater programmability and code reuse in a parallel environment. Functions are described textually in the runtime, by utilizing reflection APIs to obtain their containing class and method names. Runtime arguments may be serialized for transport within the "collective" implementation. In some cases, the serialization may be provided by the programming language itself. Transport and invocation of the "collective" method may be accomplished by broadcasting the method signature along with the serialized input arguments. Generic functions (e.g. 106) may be identified via reflection, and will, in addition to receiving the actual runtime arguments, receive a collection of the type signatures, which may be used by reflection APIs to resolve the actual address of the overloaded or type specialized function that is to be invoked. Once a local method is resolved and the runtime arguments are de-serialized, then the selected method can be invoked on each of the parallel ranks. Error handling and transport of exceptions for processing may be implicitly provided in such implementations. These concepts will be explained further below with regard to methods 200 and 300 of FIGS. 2 and 3, respectively.

Figure 2:
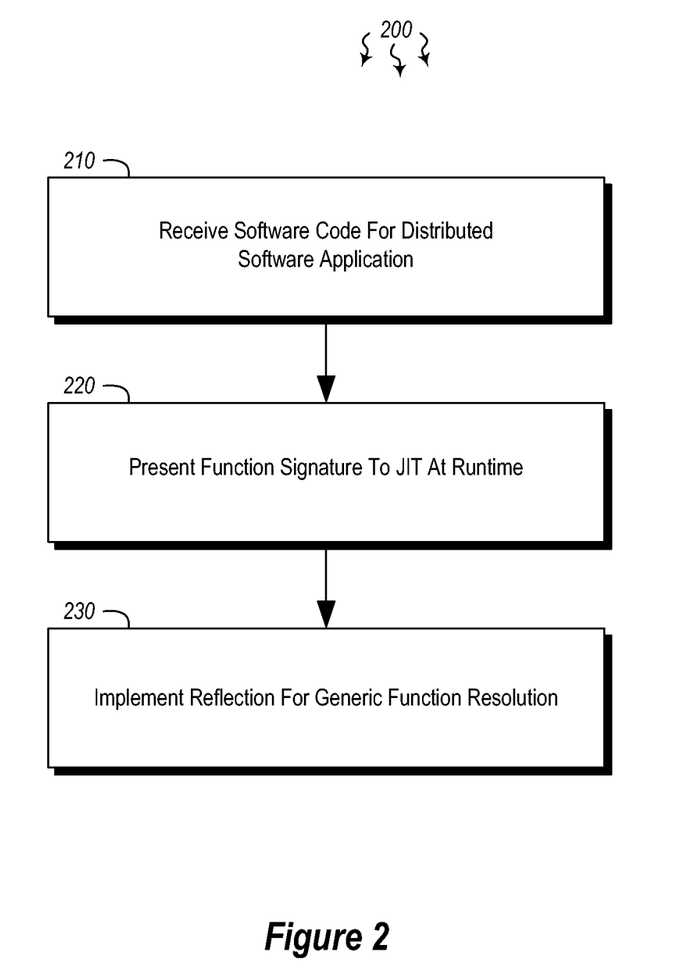
FIG. 2 illustrates a flowchart of an example method for providing a generic software function for a plurality of data types in a distributed environment.
Figure 3:
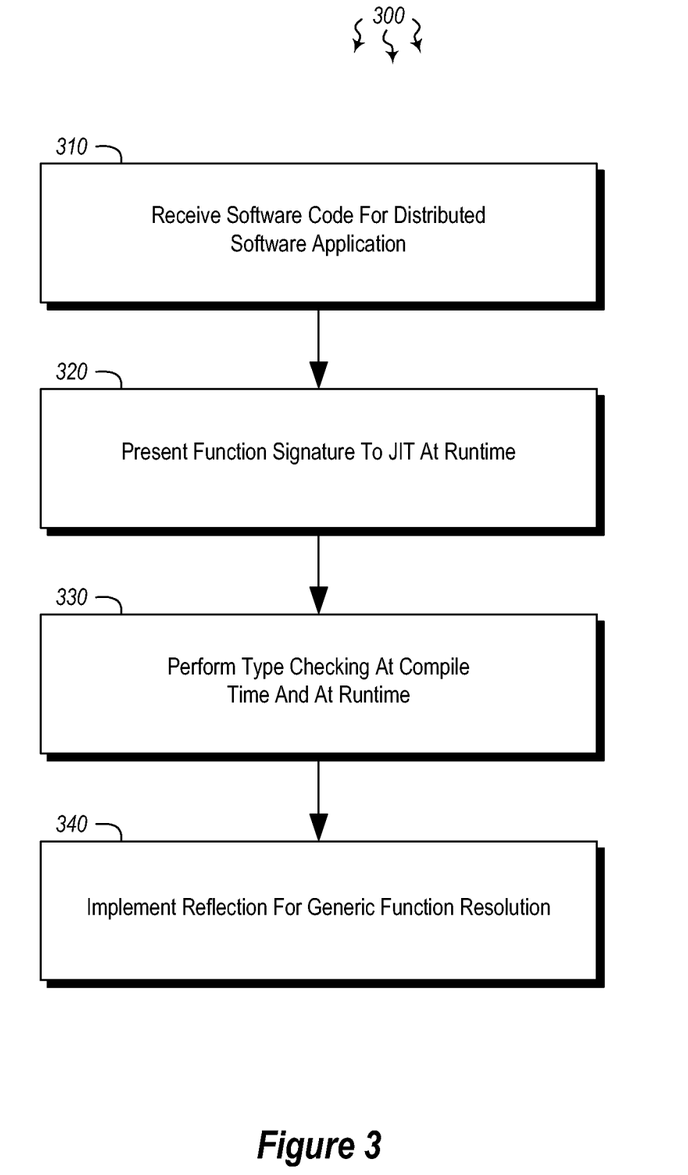
FIG. 3 illustrates a flowchart of an example method for implementing type checking at compile time and at runtime.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing a generic software function for a plurality of data types in a distributed environment. The method 200 will now be described with frequent reference to the components and data of environment 100.

Method 200 includes an act of receiving a portion of software code for a distributed software application, the software code being written as a generic function in a computer programming language that supports reflection (act 210). For example, receiving module 115 of computer system 101 may receive or otherwise access generic function 106. The generic function 106 includes software code that works with multiple different data types without needing to rewrite the function. The generic function 106 may be coded in one of a variety of different programming languages that support reflection. The generic function allows the use of multiple input arguments of the same or different types. The generic function also allows multiple different combinations of data types including int, float, double, char, and other known data types.

In addition to the above, generic functions may also be usable in a software application or other function without being (formally) registered beforehand. Typically, each function must be registered before it can be used in a function. Moreover, distributed application functions typically specify that functions are to be looked up on a lookup table. Generic functions, however, as described herein can be used without performing a table lookup beforehand. In some cases, the generic function may be thought of as a template that is usable with a multiple different data types. The template may be implemented, for example, to generate at least two different functions using different data types. The compiler (e.g. JIT 120) then selects the appropriate function based on the incoming data type.

Method 200 also includes an act of presenting a function signature at runtime to a just-in-time (JIT) compiler, the function signature describing which of a plurality of input and output data types the generic function is configured to work with (act 220). For example, the function signature 108 of generic function 106 may be presented at the JIT compiler 120. The function signature specifies to the compiler which input and output data types (121 and 122, respectively) the generic function 106 works with and, as a result, which data types the compiler 120 can expect to see. In some cases, serialization may be used to package type signatures with function information and arguments. For example, serialization may be used to package type signatures with function information and arguments when performing an "add" operation on an integer array.

In some embodiments, user 105 may be able to add one or more additional functions by broadcasting function signature and type information to various ranks. For instance, various ranks may exist within the message passing interface (MPI) system for distributing messages in a distributed or parallel application. The additional functions may be added by broadcasting function signatures 108 and associated type information for the types that will be used. Then, the functions may be used in the distributed application. Additional method invocation steps may be performed by reflection during runtime by the JIT compiler 120. Moreover, type checking is performed (e.g. by type checking module 130) at runtime and at compile time to determine whether type-based errors exist in the software code. This is in contrast to most systems that only perform compile time or runtime checks.

Method 200 further includes an act of implementing reflection at runtime to resolve each generic function to a function pointer after compilation by the JIT (act 230). Accordingly, the reflection function built into many modern programming languages (e.g. reflection module 125) may be used to resolve the generic function 106 to a function pointer 126 after compilation by JIT compiler 120. In other systems, unique identifiers are cached along with a local function pointer and thus transport between processes is automated through the use of a remote procedure call (RPC) compiler. In embodiments described herein, reflection allows the executing runtime to determine the desired generic methods on-the-fly by providing sufficient data type information (e.g. input and output types 121 and 122) along with text strings which identify the generic method. Indeed, the generic software function 106 may be described textually in the runtime and various reflection application programming interfaces (APIs) may be used to obtain the generic function's corresponding containing class and method names. When reconstituted on MPI ranks greater than zero along with the number and type declarations supplied by the user 105 (or compiler 120), the reflection capabilities provide the application writer with most (if not all) the capabilities and benefits of utilizing function delegates, but in the context of a distributed parallel implementation. Thus, generic functions may be used by a developer to provide functions with a variety of different data types.

Turning now to FIG. 3, a flowchart of a method 300 for implementing type checking at compile time and at runtime is illustrated. The method 300 will now be described with frequent reference to the components, modules and data of environment 100 of FIGS. 1 and 400 of FIG. 4.

Method 300 includes an act of receiving a portion of software code for a distributed software application, the software code being written as a generic function in a computer programming language that supports reflection (act 310). For example, receiving module 115 of computer system 101 may receive software code 107 that is written as a generic function 106. As explained above, generic function 106 templates may be used such that the generic function 106 can work with a variety of different data types. Generic function 106 templates may also prevent users from having to hand-code type-specific methods, as the one template works with a variety of different data types. For example, if a developer was writing a sort function for integers, a sort function for strings, and a sort function for doubles, the developer would not have to build a separate dispatch table with each type; rather, with generic functions, the developer can write one version of sort function, use generic parameters and write one implementation that works for all data types. The compiler then picks the correct implementation based on the incoming data type.

In some cases, the generic software function may be written as an overloaded or type-specialized function. This overloaded function may be specially configured for use in parallel or distributed functions. In such cases, distributed input objects may trigger parallel invocation of the overloaded function via a collective action command. As mentioned above, transport and invocation of a "collective" method may be accomplished by broadcasting the method signature along with various serialized input arguments.

Method 300 also includes an act of presenting a function signature at runtime to a just-in-time (JIT) compiler, the function signature describing which of a plurality of input and output data types the generic function is configured to work with (act 320). The runtime and JIT compiler 120 determine one or more appropriate functions to perform based on the received generic software function. The type checking module 130 may then perform type checking on the generic function 106 at compile time and at runtime to determine whether type-based errors exist in the software code (act 330).

Figure 4:
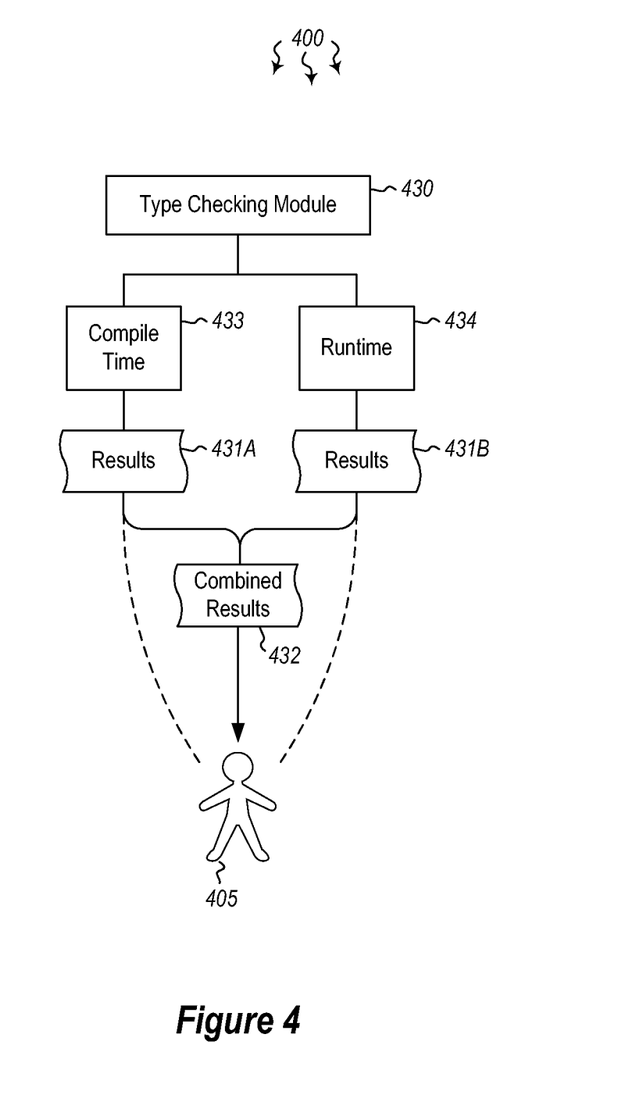
FIG. 4 illustrates an embodiment in which type checking is implemented at compile time and at runtime.

As shown in environment 400 of FIG. 4, type checking module 430 may perform type checking at both compile time 433 and at runtime 434. The results of the compile time check 431A and the results of the runtime check 431B may be combined 432 and sent to the user 405. The results may indicate to the user whether a type problem exists. By checking at both compile time and at runtime, problems caused by data typing errors may be avoided. Moreover, performing type checking on the generic function at compile time and at runtime may, at least in some cases, avoid wrapping arguments as objects. Method 300 then implements reflection at runtime to resolve each generic function to a function pointer after compilation by the JIT (act 340). The function pointer may be sent to the user 405 as results (131 or 432), or may be displayed within the integrated development environment 110 for use by the developer in coding other functions or applications.

Accordingly, methods, systems and computer program products are provided which provide a generic software function for multiple different data types in a distributed environment. Moreover, methods, systems and computer program products are provided which implement type checking both at compile time and at runtime.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method of improving the ease with which a distributed application designed for parallel processing is created when developers of the distributed application are writing distributed parallel algorithms in a distributed runtime environment, by providing generic language support that is automatically customized by a compiler at runtime to support different input and output data types, the computer-implemented method comprising acts of:
    generating for one or more portions of software code for a distributed software application a corresponding generic function coded to work with multiple different data types, each generic function being written in a computer programming language that supports reflection, and each generic function comprising:
        a template coded to work with at least two different data types by providing at least two different functions using the different data types, the two different functions permitting input arguments of the different data types respectively; and
        a function signature describing which of a plurality of input and output data types the generic function is configured to work with;
    broadcasting the function signature and the signature's input and output data types to one or more ranks to enable addition of one or more additional functions to the generic function;
    receiving at an integrated development environment of a computing system a generic function generated for said one or more portions of software code for the distributed software application;
    for each received generic function presenting the function signature for the received generic function at runtime to a just-in-time (JIT) compiler so as to specify to the JIT which input and output data types the received generic function will work with; and
    identifying with a reflection module each generic function presented to the JIT and resolving each generic function to a function pointer after compilation by the JIT.

2. The method of claim 1, wherein generic functions are usable without being registered beforehand.

3. The method of claim 1, wherein generic functions are usable without performing a table lookup beforehand.

4. The method of claim 1, wherein in response to broadcasting the function signature and the signature's input and output data types to one or more ranks to enable addition of one or more additional functions to the generic function, one or more additional functions are added to the generic function.

5. The method of claim 1, wherein at runtime a collective application program interface (API) executes a specified method on all parallel ranks and wherein the specified method includes support of said generic functions and function overloading.

6. The method of claim 1, wherein once a generic function is resolved the generic function includes de-serializing all data type arguments for the generic function.

7. The method of claim 6, wherein once the generic function is resolved and the data type arguments are de-serialized the corresponding generic function is invoked on each parallel rank.

8. The method of claim 1, wherein the JIT compiler selects the appropriate generic function based on one or more incoming data types.

9. The method of claim 1, wherein serialization is used to package type signatures with function information and arguments for each generic function.

10. The method of claim 1, wherein type checking is performed both at runtime and at compile time to determine whether type-based errors exist in the software code.

11. The method of claim 1, wherein each generic function allows use of multiple input arguments.

12. The method of claim 1, wherein each generic function allows multiple combinations of data types.

13. The method of claim 1, wherein each generic software function is described textually at runtime and one or more reflection application programming interfaces (APIs) are used to obtain each generic function's corresponding containing class and method names.

14. A computer-implemented method of improving the ease with which a distributed application designed for parallel processing is created when developers of the distributed application are writing distributed parallel algorithms in a distributed runtime environment, by providing generic language support that is automatically customized by a compiler at runtime to support different input and output data types, the computer-implemented method comprising acts of:

generating for one or more portions of software code for a distributed software application a corresponding generic function coded to work with multiple different data types, each generic function being written in a computer programming language that supports reflection, and each generic function comprising:

a template coded to work with at least two different data types by providing at least two different functions using the different data types, the two different functions permitting input arguments of the different data types respectively; and a function signature describing which of a plurality of input and output data types the generic function is configured to work with;

broadcasting the function signature and the signature's input and output data types to one or more ranks to enable addition of one or more additional functions to the generic function;

receiving at an integrated development environment of a computing system a generic function generated for said one or more portions of software code for the distributed software application;

for each received generic function presenting the function signature for the received generic function at runtime to a just-in-time (JIT) compiler so as to specify to the JIT which input and output data types the received generic function will work with;

performing type checking for each received generic function at both compile time and at runtime and combining the results of both the compile time type check and the runtime type check to determine whether type-based errors exist in the software code, and outputting the results; and identifying with a reflection module each generic function presented to the JIT and resolving each generic function to a function pointer after compilation by the JIT.

15. The method of claim 14, wherein in response to broadcasting the function signature and the signature's input and output data types to one or more ranks to enable addition of one or more additional functions to the generic function, one or more additional functions are added to a the generic function.

16. The method of claim 15, wherein at runtime a collective application program interface (API) executes a specified method on all parallel ranks and wherein the specified method includes support of said generic functions and function overloading.

17. The method of claim 16, wherein once a generic function is resolved the generic function includes de-serializing all data type arguments for the generic function, and wherein once the data type arguments are de-serialized the corresponding generic function is invoked on each parallel rank.

18. The method of claim 14, wherein each generic software function is written as an overloaded function.

19. The method of claim 18, wherein one or more distributed input objects trigger parallel invocation of the overloaded function via a collective action command.

20. A computer system comprising the following:

one or more processors;

system memory;

one or more hardware storage devices having stored thereon computer-executable instructions that, when executed by the one or more processors, causes the computing system to perform a computer-implemented method for providing generic language support that is automatically customized by a compiler at runtime to support different input and output data types, the computer-implemented method comprising acts of:

generating for one or more portions of software code for a distributed software application a corresponding generic function coded to work with multiple different data types, each generic function being written in a computer programming language that supports reflection, and each generic function comprising:

a template coded to work with at least two different data types by providing at least two different functions using the different data types, the two different functions permitting input arguments of the different data types respectively; and a function signature describing which of a plurality of input and output data types the generic function is configured to work with;

broadcasting the function signature and the signature's input and output data types to one or more ranks to enable addition of one or more additional functions to the generic function;

receiving at an integrated development environment of a computing system a generic function generated for said one or more portions of software code for the distributed software application;

for each received generic function presenting the function signature for the received generic function at runtime to a just-in-time (JIT) compiler so as to specify to the JIT which input and output data types the received generic function will work with;

performing type checking for each received generic function at both compile time and at runtime and combining the results of both the compile time type check and the runtime type check to determine whether type-based errors exist in the software code, and outputting the results; and identifying with a reflection module each generic function presented to the JIT and resolving each generic function to a function pointer after compilation by the JIT.

\* \* \* \* \*